United States Patent
Obeid et al.

(10) Patent No.: US 12,136,737 B2
(45) Date of Patent: Nov. 5, 2024

(54) CHANNEL BRACKETS WITH INTEGRATED RETENTION LOOPS FOR RETAINING BATTERY PACK INTERNAL COMPONENTS

(71) Applicant: FORD GLOBAL TECHNOLOGIES, LLC, Dearborn, MI (US)

(72) Inventors: Tarek Obeid, Dearborn Heights, MI (US); Ihab Grace, Grosse Pointe Woods, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 849 days.

(21) Appl. No.: 16/794,470

(22) Filed: Feb. 19, 2020

(65) Prior Publication Data

US 2021/0257598 A1   Aug. 19, 2021

(51) Int. Cl.
*H01M 50/20*   (2021.01)
*H01M 50/502*   (2021.01)

(52) U.S. Cl.
CPC ......... *H01M 50/20* (2021.01); *H01M 50/502* (2021.01); *H01M 2220/20* (2013.01)

(58) Field of Classification Search
CPC .............. H01M 50/20; H01M 50/502; H01M 2220/20; H01M 50/204; H01M 50/298; H01M 50/249; B60K 1/04; B60L 50/66; F16B 39/24

See application file for complete search history.

(56) References Cited

U.S. PATENT DOCUMENTS

| | | | |
|---|---|---|---|
| 2001/0048860 A1* | 12/2001 | Ross ................... | F16B 41/002 411/352 |
| 2010/0054894 A1* | 3/2010 | Caballero Asensio . | F16B 39/10 411/524 |
| 2013/0183117 A1* | 7/2013 | Warburton ........... | F16B 33/002 411/119 |
| 2015/0125720 A1* | 5/2015 | Fujii .................... | B60L 58/26 429/56 |
| 2016/0121822 A1 | 5/2016 | Shaw et al. | |
| 2019/0293108 A1* | 9/2019 | Sandwall ............. | F16B 41/002 |

FOREIGN PATENT DOCUMENTS

| | | |
|---|---|---|
| CN | 108092211 A | 5/2018 |
| CN | 209104241 U | 7/2019 |
| CN | 209336646 U | 9/2019 |
| JP | 5406618 B2 | 2/2014 |

* cited by examiner

*Primary Examiner* — Michael L Dignan
(74) *Attorney, Agent, or Firm* — David B. Kelley; Carlson, Gaskey & Olds, P.C.

(57) ABSTRACT

This disclosure details exemplary battery pack designs for use in electrified vehicles. An exemplary battery pack may include an enclosure assembly, one or more battery arrays housed within the enclosure assembly, and one or more channel brackets for routing and retaining battery internal components (e.g., wiring harnesses, etc.) within internal channels of the battery pack. The channel brackets may include a mounting platform having a loop that is connected to the mounting platform by a tether. A clip fastener may be received through both the loop and the mounting platform for mounting the channel brackets in place. The loop of the channel bracket is configured to increase the integrity of the clip fastener joint.

20 Claims, 5 Drawing Sheets

CHANNEL BRACKETS WITH INTEGRATED RETENTION LOOPS FOR RETAINING BATTERY PACK INTERNAL COMPONENTS

TECHNICAL FIELD

This disclosure relates generally to battery packs, and more particularly to channel brackets for positioning, routing, and retaining battery internal components inside traction battery packs.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by battery powered electric machines. Conventional motor vehicles, by contrast, rely exclusively on the internal combustion engine to propel the vehicle.

A high voltage battery pack typically powers the electric machines and other electrical loads of the electrified vehicle. An enclosure assembly of the battery pack houses a plurality of battery cells that store energy for powering these electrical loads. Various other internal components, including but not limited to a battery electric control module (BECM), a bussed electrical center (BEC), electrical distribution system (EDS) wiring, etc., must also be packaged and retained inside the enclosure assembly.

SUMMARY

A battery pack according to an exemplary aspect of the present disclosure includes, among other things, an enclosure assembly, a first battery array housed within the enclosure assembly, a first channel bracket mounted to first battery array and including a mounting platform and a loop connected to the mounting platform by a tether, and a battery internal component retained by the first channel bracket.

In a further non-limiting embodiment of the foregoing battery pack, the battery internal component is a wiring harness of an electrical distribution system.

In a further non-limiting embodiment of either of the foregoing battery packs, the first channel bracket is secured to the first battery array by a clip fastener.

In a further non-limiting embodiment of any of the foregoing battery packs, the clip fastener includes a ribbed anchoring prong received through the loop and through the mounting platform and extending into a mounting surface of the first battery array.

In a further non-limiting embodiment of any of the foregoing battery packs, the mounting surface is established by an end plate or an array frame of the first battery array.

In a further non-limiting embodiment of any of the foregoing battery packs, a second battery array is housed within the enclosure assembly. The first channel bracket is mounted to each of the first battery array and the second battery array.

In a further non-limiting embodiment of any of the foregoing battery packs, the first channel bracket includes a body having a floor and a pair of sidewalls that protrude upwardly from the floor. The mounting platform protrudes outwardly from a first sidewall of the pair of sidewalls.

In a further non-limiting embodiment of any of the foregoing battery packs, a clamp extends between the first sidewall and a second sidewall of the pair of sidewalls.

In a further non-limiting embodiment of any of the foregoing battery packs, a rib protrudes upwardly from the floor and establishes a grooved channel of the first channel bracket. At least a portion of the battery internal component is routed within the grooved channel of the first channel bracket.

In a further non-limiting embodiment of any of the foregoing battery packs, a second channel bracket retains the battery internal component. The second channel bracket includes a different design configuration than the first channel bracket.

A battery pack according to another exemplary aspect of the present disclosure includes, among other things, an enclosure assembly including a tray and a cover, a first battery array received within the tray, a second battery array received within the tray and spaced apart from the first battery array, a channel extending between the first and second battery arrays, and a first channel bracket positioned within the channel. The first channel bracket includes a mounting platform and a loop connected to the mounting foot by a tether. A wiring harness is retained within the channel by the first channel bracket, and a clip fastener is received through the loop and through the mounting platform and extends into a portion of at least one of the first battery array or the second battery array for mounting first channel bracket within the channel.

In a further non-limiting embodiment of the foregoing battery pack, a ribbed anchoring prong of the clip fastener is received through a first opening of the loop and a second opening of the mounting platform. The portion is established by an array frame or an end plate of the first battery array or the second battery array.

In a further non-limiting embodiment of either of the foregoing battery packs, the tether is movable between an unfolded position in which the loop is displaced from the mounting platform and a second position in which the loop is received against an upper surface of the mounting platform.

In a further non-limiting embodiment of any of the foregoing battery packs, the first channel bracket includes a body having a floor and a pair of sidewalls that protrude upwardly from the floor. The mounting platform protrudes outwardly from a first sidewall of the pair of sidewalls.

In a further non-limiting embodiment of any of the foregoing battery packs, a clamp extends between the first sidewall and a second sidewall of the pair of sidewalls and is configured to clamp the wiring harness against the floor.

In a further non-limiting embodiment of any of the foregoing battery packs, a rib protrudes upwardly from the floor and establishes a grooved channel of the first channel bracket. A portion of the wiring harness is routed within the grooved channel of the first channel bracket.

In a further non-limiting embodiment of any of the foregoing battery packs, a curved channel extends from the first sidewall. A sense lead of the wiring harness is routed within a pocket of the curved channel.

In a further non-limiting embodiment of any of the foregoing battery packs, the wiring harness is part of an electrical distribution system that connects between a bussed electrical center (BEC) and a battery electric control module (BECM) of the battery pack.

In a further non-limiting embodiment of any of the foregoing battery packs, a second channel bracket retains the wiring harness. The second channel bracket includes a different design configuration than the first channel bracket.

In a further non-limiting embodiment of any of the foregoing battery packs, a third channel bracket retains the wiring harness. The third channel bracket includes a different design configuration from either of the first channel bracket and the second channel bracket.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. An exemplary battery pack may include an enclosure assembly, one or more battery arrays housed within the enclosure assembly, and one or more channel brackets for routing and retaining battery internal components (e.g., wiring harnesses, etc.) within internal channels of the battery pack. The channel brackets may include a mounting platform having a loop that is connected to the mounting platform by a tether. A clip fastener may be received through both the loop and the mounting platform for mounting the channel brackets in place. The loop of the channel bracket is configured to increase the integrity of the clip fastener joint. These and other features are discussed in greater detail in the following paragraphs of this

DETAILED DESCRIPTION

Figure 1:
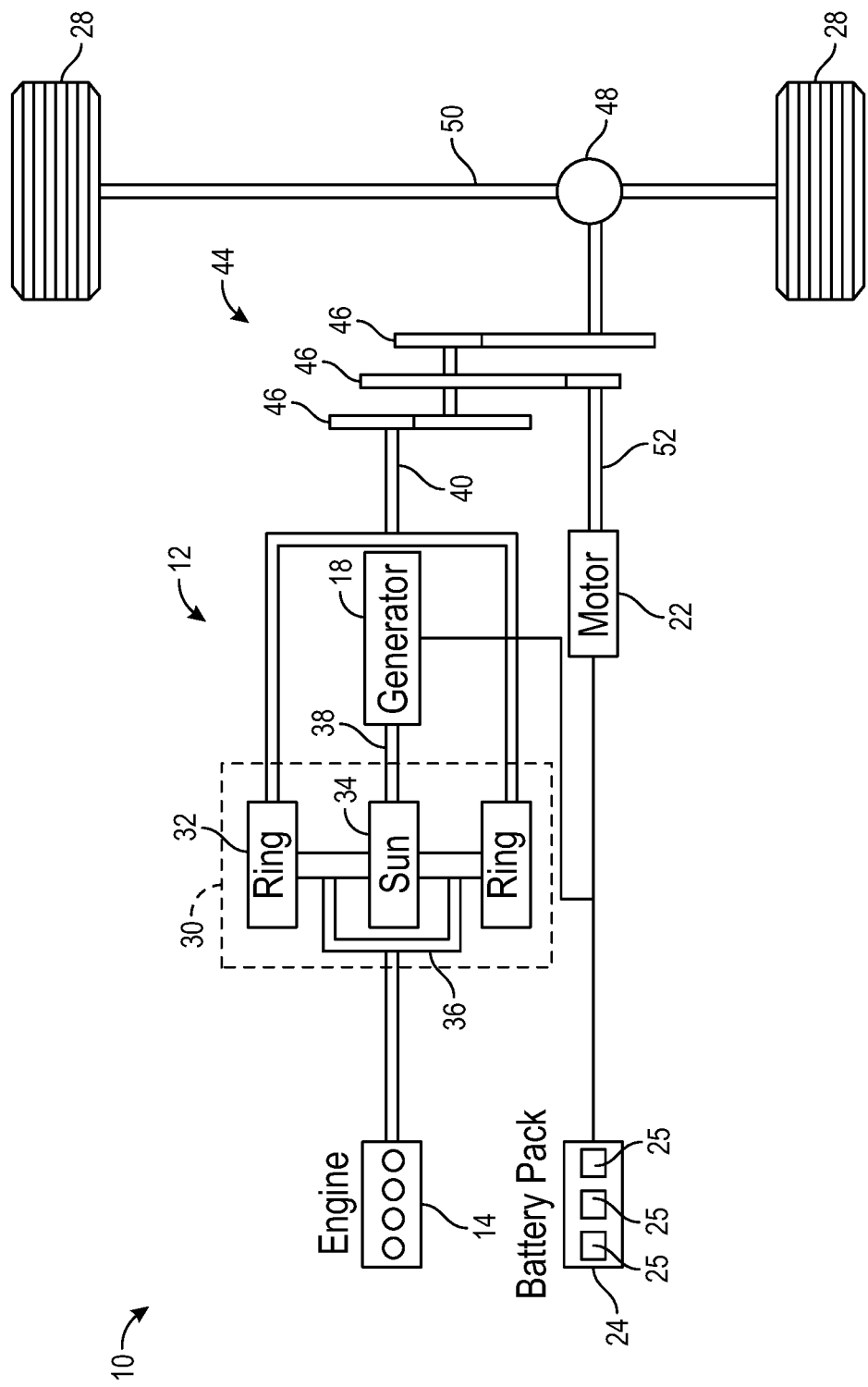
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
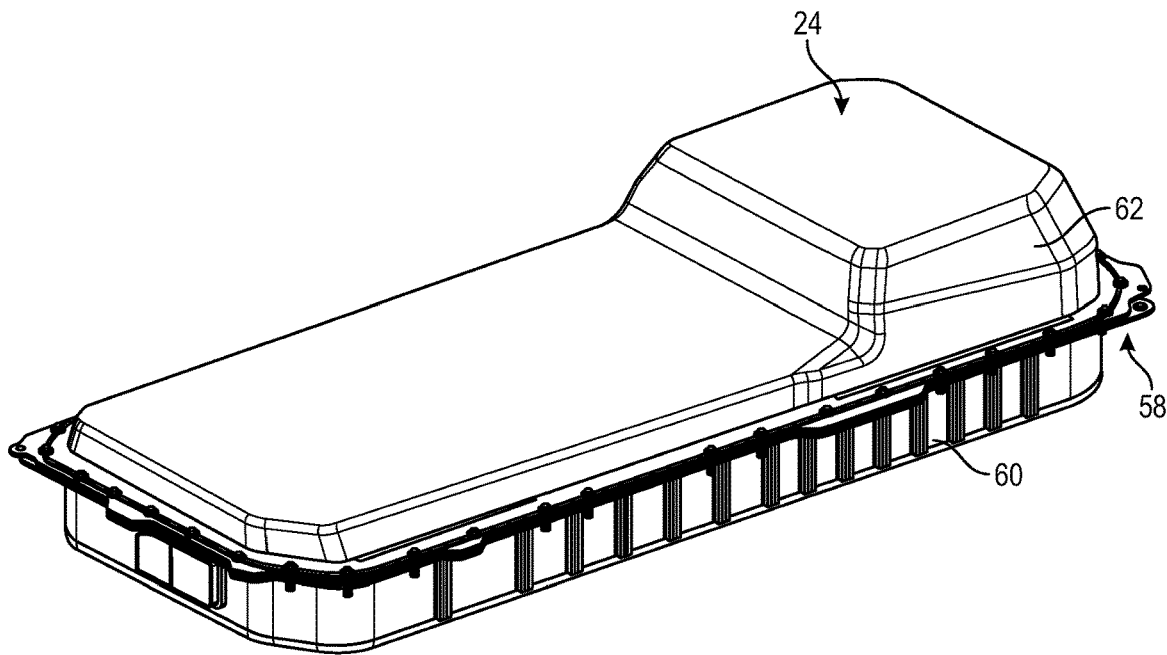
FIG. 2 illustrates a battery pack of an electrified vehicle.
Figure 3:
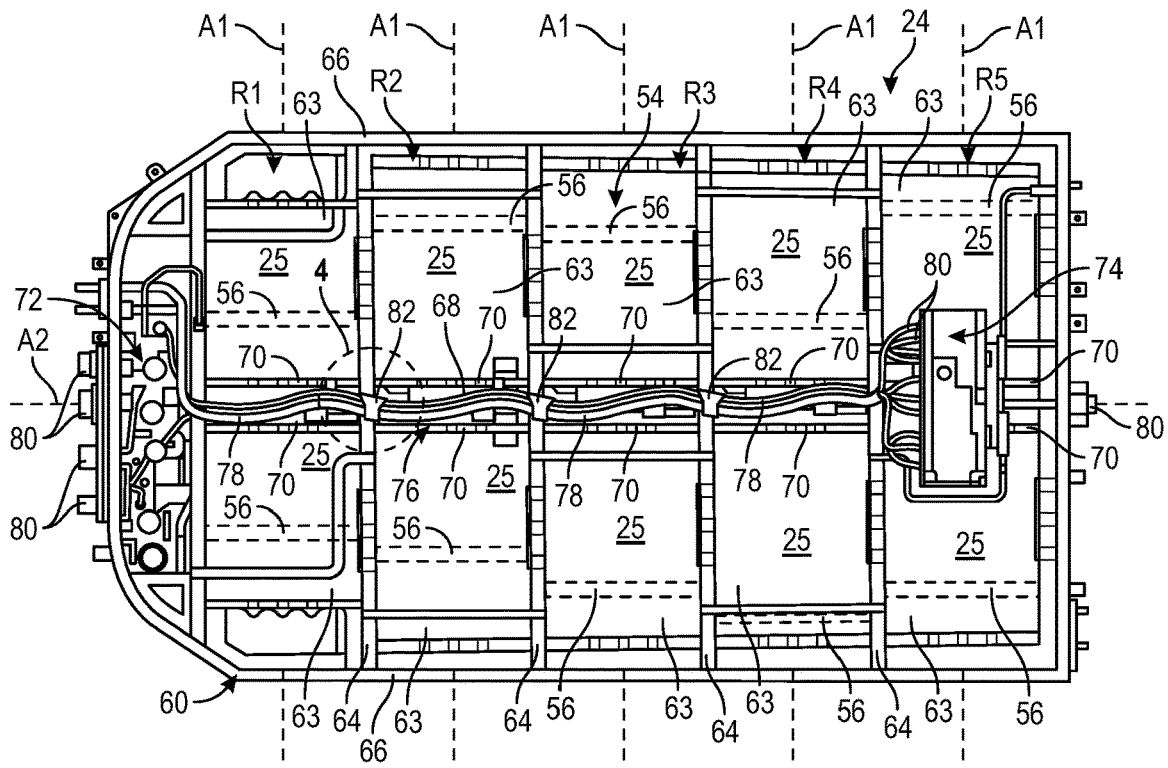
FIG. 3 is a top view of the battery pack of FIG. 2. A cover of an enclosure assembly of the battery pack is removed in FIG. 3 to better illustrate the battery internal components of the battery pack.

FIGS. 2 and 3 illustrate a battery pack 24 that can be employed within an electrified vehicle. For example, the battery pack 24 could be employed as part of the powertrain 10 of the electrified vehicle 12 of FIG. 1. FIG. 2 is an assembled, perspective view of the battery pack 24, and portions (e.g., a cover 62) of the battery pack 24 are removed in FIG. 3 in order to better visualize its internal contents.

The battery pack 24 may include a battery system 54 (best shown in FIG. 3) housed within an enclosure assembly 58. The enclosure assembly 58 may be a sealed enclosure and may embody any size, shape, and configuration within the scope of this disclosure. In an embodiment, the enclosure assembly 58 includes a tray 60 and a cover 62. During assembly, the battery system 54 may be positioned within the tray 60, and the cover 62 may then be fixedly secured to the tray 60 to seal the battery system 54 therein. The tray 60 and the cover 62 may be made of any material or combination of materials, including metallic and/or polymeric materials.

The battery system 54 includes a plurality of battery cells 56 that store energy for powering various electrical loads of the electrified vehicle 12. The battery system 54 could include any number of battery cells 56 within the scope of this disclosure. Therefore, this disclosure is not limited to the exact configuration of the battery system 54 shown in FIG. 3.

The battery cells 56 may be stacked side-by-side to construct a grouping of battery cells 56, sometimes referred to as a battery array. The battery cells 56 may be retained relative to one another by a plurality of array frames 63. The array frames 63 may be made of plastics or other materials. In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The exemplary battery system 54 depicted in FIG. 3 includes five rows (labeled as rows R1, R2, R3, and R4) of two laterally adjacent battery arrays 25 for a total of ten battery arrays 25. However, the battery system 54 could include a greater or fewer number of battery arrays and still fall within the scope of this disclosure.

The battery cells 56 and the array frames 63 of each of the battery arrays 25 may be distributed along a longitudinal axis A1. In an embodiment, the longitudinal axis A1 of each battery array 25 is transverse (e.g., about perpendicular) to a central longitudinal axis A2 of the tray 60. However, other arrangements and configurations of the battery arrays 25 are also contemplated within the scope of this disclosure.

A battery internal structure 64, such as a relatively rigid cross member, may be positioned between each adjacent row of battery arrays 25. In general, the battery internal structures 64 add rigidity to the battery pack 24 and may establish mounting points for securing the battery arrays 25 relative to the tray 60.

In an embodiment, one battery internal structure 64 is disposed between the rows R1 and R2 of battery arrays 25, another battery internal structure 64 is disposed between the rows R2 and R3, another battery internal structure 64 is disposed between the rows R3 and R4, and yet another battery internal structure 64 is disposed between the rows R4 and R5 for a total of four battery internal structures 64 provided within the enclosure assembly 58. However, the total number of battery internal structures 64 provided inside the enclosure assembly 58 is not intended to limit this disclosure.

The battery internal structures 64 may connect between longitudinally extending side walls 66 of the tray 60 and therefore are arranged, in the illustrated embodiment, in a cross-vehicle orientation. In an embodiment, both the battery arrays 25 and the battery internal structures 64 extend along axes A1 that are generally perpendicular to the central longitudinal axis A2 of the tray 60.

The adjacent battery arrays 25 of reach row R1-R5 may be spaced apart from one another to establish a channel 68 that extends along a center of the tray 60. The channel 68 may extend horizontally between end plates 70 of the adjacent battery arrays 25. In an embodiment, the channel 68 extends along the central longitudinal axis A2 such that a centerline axis of the channel 68 is coincident with the central longitudinal axis A2. In another embodiment, the central longitudinal axis A2 bisects the channel 68. As is further discussed below, various battery internal components can be routed through the channel 68 in order to better utilize this space for increasing the overall packaging efficiency of the battery pack 24.

The battery system 54 may additionally include a plurality of electrical components (see features 72-80) that establish an electrical assembly of the battery system 54. The electrical components may include, but are not limited to, a bussed electrical center (BEC) 72, a battery electric control module (BECM) 74, and an electrical distribution system (EDS) 76, which may include one or more wiring harnesses 78, a plurality of input/output (I/O) connectors 80, etc.

The wiring harnesses 78 of the EDS 76 may be connected to the battery arrays 25 and the BEC 72 and/or the BECM 74 for monitoring the health of the battery cells 56 of each battery array 25. At least a portion of the wiring harnesses 78, and/or other battery internal components, may be routed within the channel 68 between the adjacent battery arrays 25. The battery system 54 may employ one or more channel brackets 82 for positioning, routing, and retaining the wiring harnesses 78 in place within the channel 68. As further detailed below, the exemplary channel brackets 82 include integrated features for improving the integrity of the fastening joints between the channel brackets 82 and the battery arrays 25, thereby providing a more cost effective retention solution for routing and retaining the wiring harnesses 78 and other battery internal components inside the battery pack 24.

Figure 4:
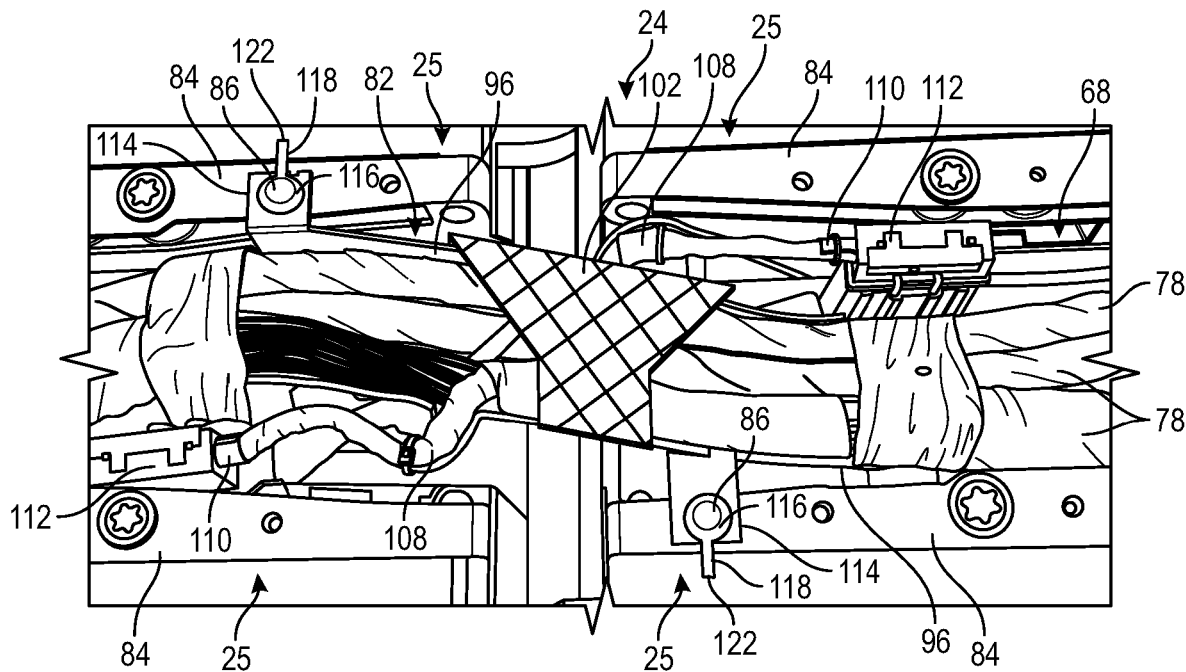
FIG. 4 is a blown-up view of select portions of the battery pack of FIG. 3.

FIG. 4 illustrates an exemplary routing and retention configuration of a plurality of wiring harnesses 78 of the battery system 54 described above. The wiring harnesses 78 may be routed and retained within the channel 68 by a channel bracket 82. Although shown as routing and retaining the wiring harnesses 78, the channel brackets 82 of this disclosure could be used to route and retain other battery internal components of the battery pack 24. In addition, although multiple wiring harnesses 78 are shown, the channel bracket 82 could be used to route one or more of the wiring harnesses 78.

The channel bracket 82 may be mounted directly to a mounting surface 84 of one or more battery arrays 25 of the battery pack 24. In the illustrated embodiment, the channel bracket 82 is mounted to two battery arrays 25, with the two battery arrays 25 being positioned in different rows of the battery system 54. However, a greater or fewer number of mounting connections arranged in other configurations relative to the battery arrays 25 could be provided within the scope of this disclosure.

In an embodiment, the mounting surfaces 84 are provided by the end plates 70 of the battery arrays 25. In another embodiment, the mounting surfaces 84 are provided by array frames 63 of the battery arrays 25.

Figure 5:
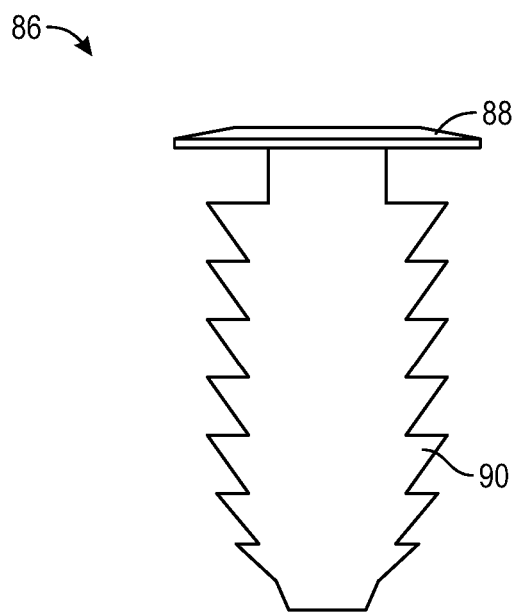
FIG. 5 illustrates an exemplary clip fastener for retaining a channel bracket within a battery pack.

The channel bracket 82 may be mounted to the mounting surfaces 84 of the battery arrays 25 using one or more clip fasteners 86. In an embodiment, the clip fasteners 86 are plastic, push-in style fasteners. An exemplary clip fastener 86 design is shown in FIG. 5. The clip fastener 86 may include a fastener head 88 and a ribbed anchoring prong 90 that extends from the fastener head 88. The diameter of the fastener head 88 is larger than the diameter of the ribbed anchoring prong 90.

Figure 6A:
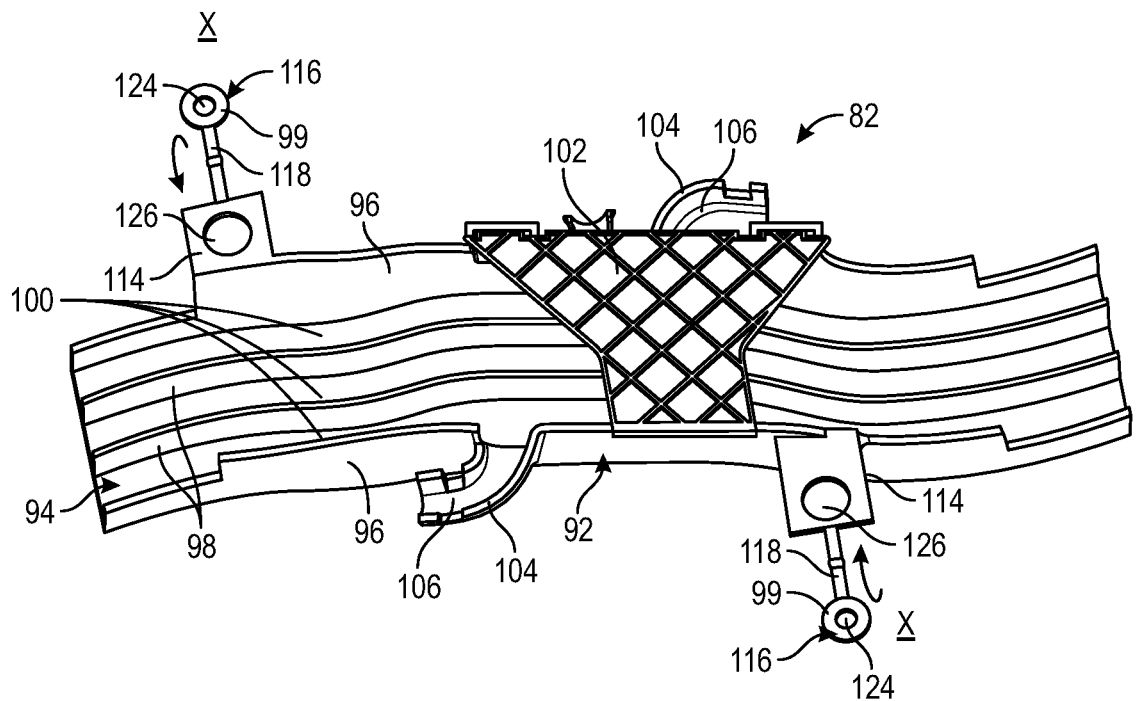
FIGS. 6A and 6B illustrate an exemplary channel bracket for retaining battery internal components within a battery pack.
Figure 6B:
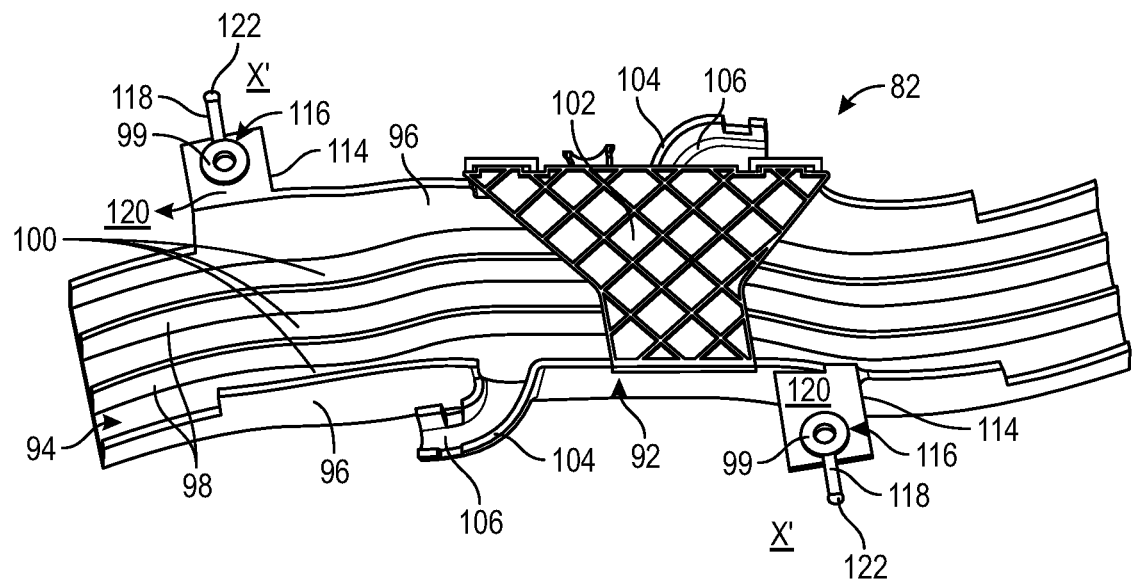

Referring now to FIGS. 4, 6A, and 6B, the channel bracket 82 may include a body 92 that includes a floor 94 and sidewalls 96 that protrude upwardly from the floor 94. One or more ribs 98, which include a smaller height than the sidewalls 96 relative to the floor 94, may additionally protrude upwardly from the floor 94 for establishing grooved channels 100 within the channel brackets 82. One or more wiring harnesses 78 (see FIG. 4) may be positioned and routed within each of the grooved channels 100.

A clamp 102 may be pivotally connected between the opposing sidewalls 96 of the channel bracket 82. The clamp 102 may be received over top of the wiring harnesses 78 for retaining the wiring harnesses 78 in place relative to the channel bracket 82. In an embodiment, the clamp 102 clamps the wiring harnesses 78 down against the floor 94 of the channel bracket 82.

One or more curved channels 104 may protrude outwardly from the channel bracket 82. The curved channels 104 establish pockets 106 for receiving sense leads 108 of the wiring harnesses 78. The sense leads 108 each include a connector 110 that is plugged into a corresponding connector 112 associated with one of the battery arrays 25 (see FIG. 4), such as for monitoring the health of the battery cells 56 of each battery array 25. In an embodiment, each curved channel 104 extends from one of the sidewalls 96 of the channel bracket 82. However, the curved channels 104 could alternatively extend from the floor 94 or some other part of the channel bracket 82.

The channel bracket 82 may additionally include one or more mounting platforms 114. In an embodiment, each mounting platform 114 extends from one of the sidewalls 96 of the channel bracket 82. However, the mounting platforms 114 could alternatively extend from the floor 94 or some other part of the channel bracket 82. The specific locations of the mounting platforms 114 may depend on the mounting locations of the battery arrays 25 to which the channel bracket 82 is mounted, among other design criteria.

Each mounting platform 114 may include a loop 116 that is connected to the mounting platform 114 by a tether 118. The tether 118 may be moved between an unfolded position X in which the loop 116 is displaced from the mounting platform 114 (see FIG. 6A) and a folded position X' in which a folded portion 122 is formed in the tether 118 in order to position the loop 116 directly against an upper surface 120 of the mounting platform 114 (see FIG. 6B). The channel bracket 82 is mounted to the battery arrays when the tether 118 is in the folded position X' and the loop 116 is received against the upper surface 120 of the mounting platform 114.

The loop 116 may include a first opening 124, and the mounting platform 114 may include a second opening 126. The clip fastener 86 may be inserted through the first opening 124, then through the second opening 126, and then into the mounting surface 84 to secure the channel bracket 82 to one of the battery arrays 25. In the mounted position, the fastener head 88 of the clip fastener 86 abuts against a ring portion 99 of the loop 116, and the ribbed anchoring prong 90 of the clip fastener 86 is received through the first and second openings 124, 126. In an embodiment, the clip fastener 86 is received through the first opening 124 and is therefore connected to the loop 116 prior to inserting the clip fastener 86 through the second opening 126 of the mounting platform 114.

Because of its insertion through both the loop 116 and the mounting platform 114, the clip fastener 86 is much less susceptible to backing out of the second opening 126. Even if the clip fastener 86 somehow backed out of the second opening 126, the clip fastener 86 would remain connected to the loop 116, thereby substantially reducing the possibility of the clip fastener 86 becoming dislodged from the channel bracket 82 during the operative life of the battery pack 24.

In an embodiment, the channel bracket 82 is constructed (e.g., molded) out of a polymeric material, such as nylon. However, other materials could be utilized to manufacture the channel bracket 82 within the scope of this disclosure.

Figure 7:
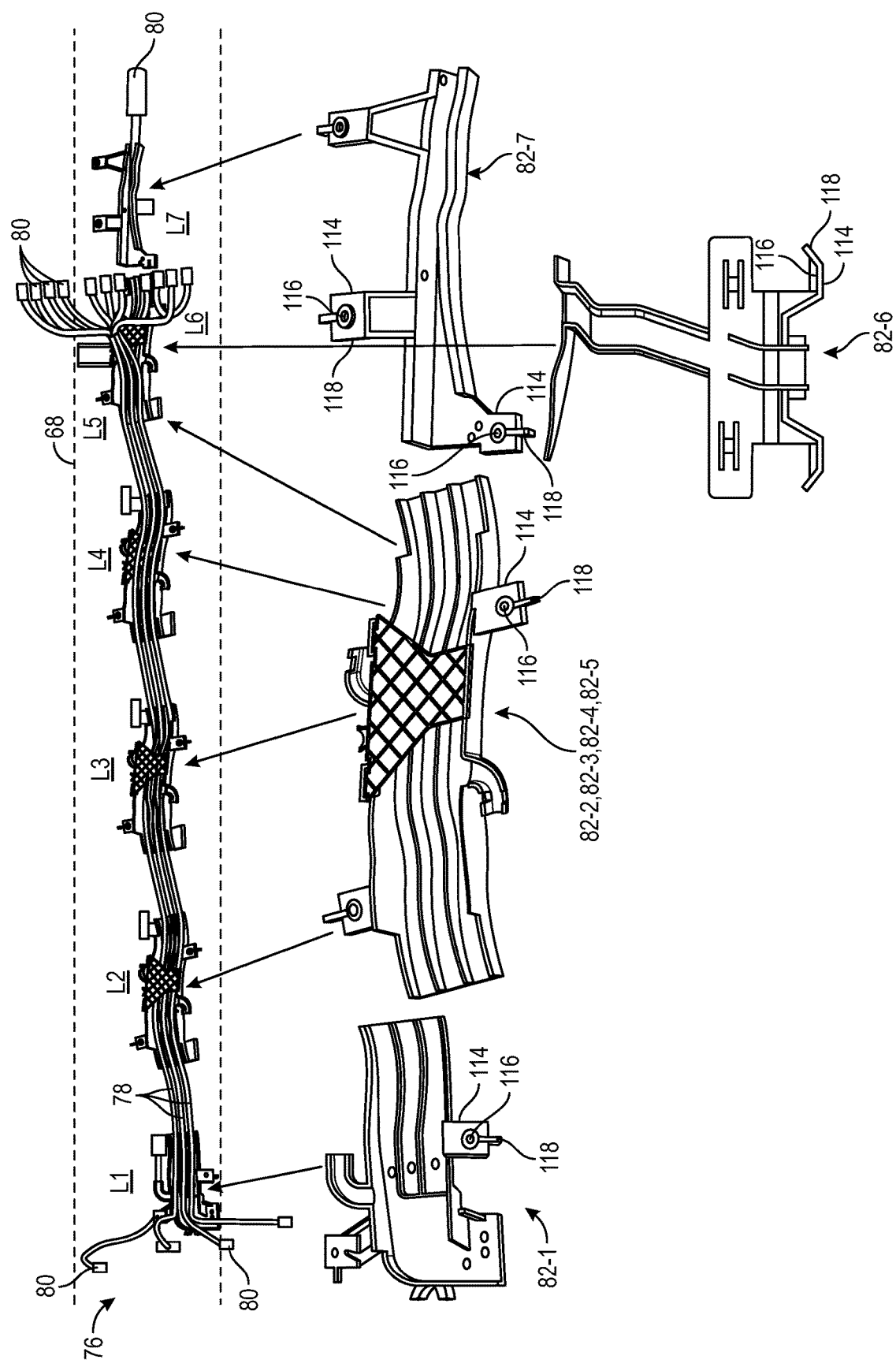
FIG. 7 illustrates an electrical distribution system of a battery pack. A plurality of channel brackets may be employed for routing and retaining portions of the electrical distribution system inside the battery pack.

FIG. 7 illustrates an exemplary electrical distribution system (EDS) 76 that may be utilized within a battery pack. The EDS 76 may include one or more wiring harnesses 78, a plurality of input/output (I/O) connectors 80, and a plurality of channels brackets 82-1, 82-2, 82-3, 82-4, 82-5, 82-6, and 82-7. Although the EDS 76 is shown in FIG. 7 as including seven channel brackets, a greater or fewer number of channel brackets may be utilized within the scope of this disclosure.

The wiring harnesses 78 of the EDS 76 may be routed within a channel 68 extending inside a battery pack, such as inside a battery pack enclosure assembly. Each of the plurality of channel brackets 82-1, 82-2, 82-3, 82-4, 82-5, 82-6, and 82-7 may be positioned and spaced from one another along the length of the wiring harnesses 78 for positioning, routing, and retaining the wiring harnesses 78 within the channel 68. For example, the channel bracket 82-1 may be positioned at a first location L1 along the length of the wiring harnesses 78, the channel bracket 82-2 may be positioned at a second location L2 along the length of the wiring harnesses 78, the channel bracket 82-3 may be positioned at a third location L3 along the length of the wiring harnesses 78, the channel bracket 82-4 may be positioned at a fourth location L4 along the length of the wiring harnesses 78, the channel bracket 82-5 may be positioned at a fifth location L5 along the length of the wiring harnesses 78, the channel bracket 82-6 may be positioned at a sixth location L6 along the length of the wiring harnesses 78, and the channel bracket 82-7 may be positioned at a seventh location L7 along the length of the wiring harnesses 78.

In an embodiment, the channel brackets 82-1, 82-6, and 82-7 include a different design (e.g., in terms of size, shape, features, configuration, etc.) from the channel brackets 82-2, 82-3, 82-4, and 82-5, which embody a common design in the illustrated embodiment. In another embodiment, each of the channel brackets 82-1, 82-6, and 82-7 include a different design from one another. Therefore, in the illustrated embodiment, the EDS 76 utilizes channel brackets having four different designs. However, other configurations of the channel brackets are also contemplated within the scope of this disclosure.

Each of the channel brackets 82-1, 82-2, 82-3, 82-4, 82-5, 82-6, and 82-7 may include one or more of the mounting platforms 114. Each mounting platform 114 include a loop 116 that is connected to the mounting platform 114 by a tether 118. The tether 118 may be moved between an unfolded position in which the loop 116 is displaced from the mounting platform 114 and a folded position in which the loop 116 is received directly against an upper surface 120 of the mounting platform 114. The channel brackets 82-1, 82-2, 82-3, 82-4, 82-5, 82-6, and 82-7 may be mounted within the channel 68 with the tethers 118 in the folded positions.

The exemplary battery packs of this disclosure employ channel brackets for positioning, routing, and retaining battery internal components inside the battery pack. The exemplary channel brackets may advantageously provide a simpler, more robust assembly process when routing battery internal components, such as EDS wiring, inside the battery packs. The tethered loop design of the channel brackets improves the integrity of the fastener joints by significantly reducing the possibility of the fasteners becoming dislodged and free-floating inside the battery pack.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   an enclosure assembly;
   a first battery array housed within the enclosure assembly;
   a first channel bracket mounted to first battery array and including a mounting platform and a loop connected to the mounting platform by a tether,
   wherein the tether is movable between an unfolded position in which the loop is displaced from the mounting platform and a second position in which the loop is received against an upper surface of the mounting platform; and
   a battery internal component retained by the first channel bracket.

2. The battery pack as recited in claim 1, wherein the battery internal component is a wiring harness of an electrical distribution system.

3. The battery pack as recited in claim 1, wherein the first channel bracket is secured to the first battery array by a clip fastener, wherein the clip fastener includes a ribbed anchoring prong received through the loop and through the mounting platform and extending into a mounting surface of the first battery array, and further wherein the mounting surface is established by an end plate or an array frame of the first battery array.

4. The battery pack as recited in claim 1, comprising a second battery array housed within the enclosure assembly, wherein the first channel bracket is mounted to each of the first battery array and the second battery array.

5. The battery pack as recited in claim 1, wherein the first channel bracket includes a body having a floor and a pair of sidewalls that protrude upwardly from the floor, wherein the mounting platform protrudes outwardly from a first sidewall of the pair of sidewalls.

6. The battery pack as recited in claim 5, comprising a clamp that extends between the first sidewall and a second sidewall of the pair of sidewalls, and wherein a rib protrudes upwardly from the floor and establishes a grooved channel of the first channel bracket, and further wherein at least a portion of the battery internal component is routed within the grooved channel of the first channel bracket.

7. The battery pack as recited in claim 1, comprising a second channel bracket for retaining the battery internal component, wherein the second channel bracket includes a different size or shape than the first channel bracket.

8. The battery pack as recited in claim 1, wherein the second position is a folded position in which a folded portion is established in the tether for positioning the loop directly against the upper surface of the mounting platform.

9. The battery pack as recited in claim 1, wherein the first channel bracket is constructed of nylon.

10. A battery pack, comprising:
    an enclosure assembly including a tray and a cover;
    a first battery array received within the tray;
    a second battery array received within the tray and spaced apart from the first battery array;
    a channel extending between the first and second battery arrays;
    a first channel bracket positioned within the channel, wherein the first channel bracket includes a mounting platform and a loop connected to the mounting platform by a tether;
    a wiring harness retained within the channel by the first channel bracket; and
    a clip fastener received through the loop and through the mounting platform and extending into a portion of at least one of the first battery array or the second battery array for mounting first channel bracket within the channel.

11. The battery pack as recited in claim 10, wherein a ribbed anchoring prong of the clip fastener is received through a first opening of the loop and a second opening of the mounting platform, and wherein the portion is established by an array frame or an end plate of the first battery array or the second battery array.

12. The battery pack as recited in claim 10, wherein the tether is movable between an unfolded position in which the loop is displaced from the mounting platform and a second position in which the loop is received against an upper surface of the mounting platform.

13. The battery pack as recited in claim 10, wherein the first channel bracket includes a body having a floor and a pair of sidewalls that protrude upwardly from the floor, wherein the mounting platform protrudes outwardly from a first sidewall of the pair of sidewalls.

14. The battery pack as recited in claim 13, comprising a clamp that extends between the first sidewall and a second sidewall of the pair of sidewalls and configured to clamp the wiring harness against the floor.

15. The battery pack as recited in claim 13, comprising a rib that protrudes upwardly from the floor and establishes a grooved channel of the first channel bracket, wherein a portion of the wiring harness is routed within the grooved channel of the first channel bracket.

16. The battery pack as recited in claim 13, comprising a curved channel that extends from the first sidewall, wherein a sense lead of the wiring harness is routed within a pocket of the curved channel.

17. The battery pack as recited in claim 10, wherein the wiring harness is part of an electrical distribution system that connects between a bussed electrical center (BEC) and a battery electric control module (BECM) of the battery pack.

18. The battery pack as recited in claim 10, comprising a second channel bracket for retaining the wiring harness, wherein the second channel bracket includes a different size or shape than the first channel bracket.

19. The battery pack as recited in claim 18, comprising a third channel bracket for retaining the wiring harness, wherein the third channel bracket includes a different size or shape from either of the first channel bracket and the second channel bracket.

20. The battery pack as recited in claim 10, wherein a ribbed anchoring prong of the clip fastener is received through a first opening of the loop and a second opening of the mounting platform, and a fastener head of the clip fastener abuts against a ring portion of the loop.

* * * * *